UNITED STATES PATENT OFFICE.

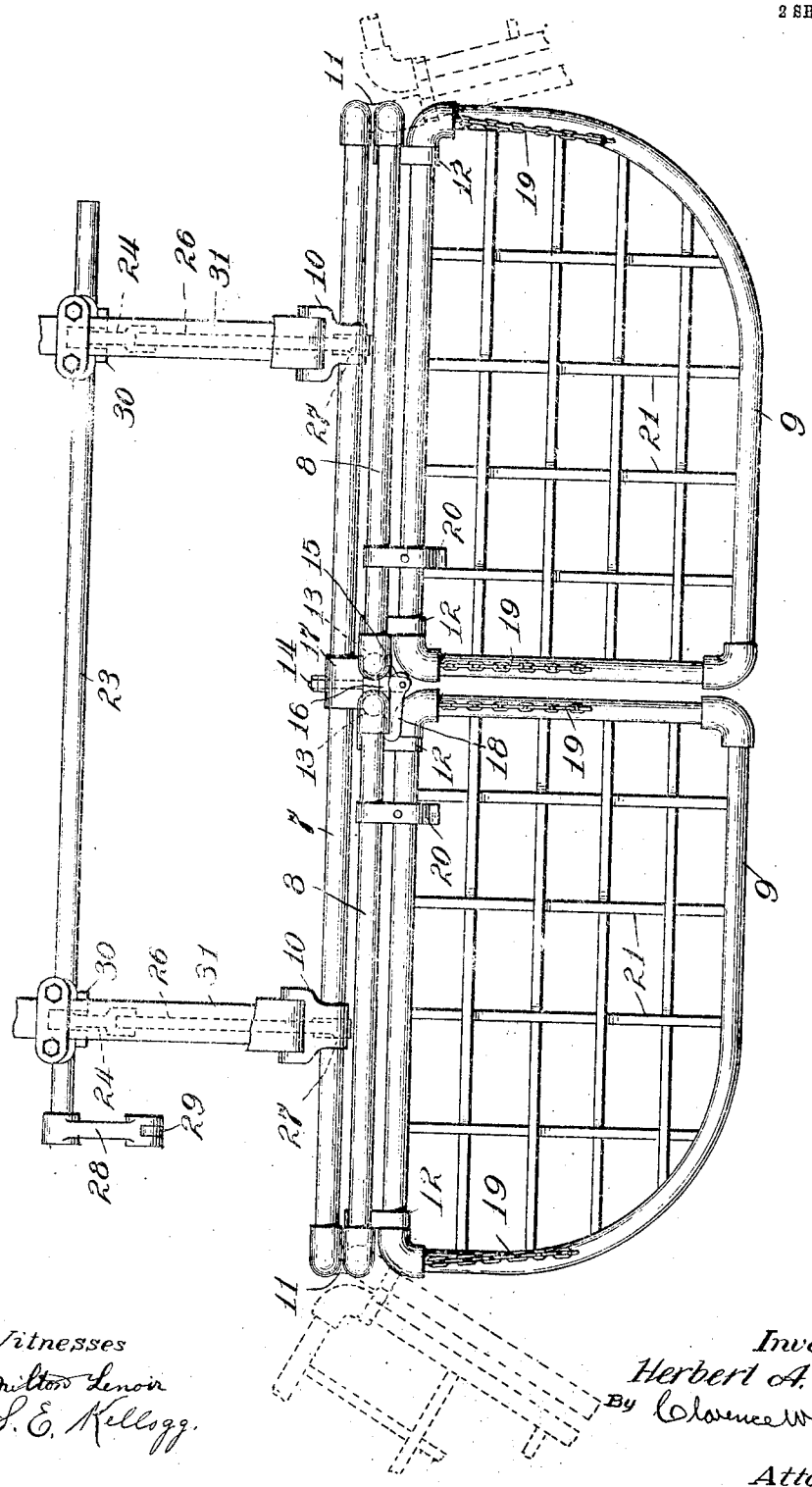

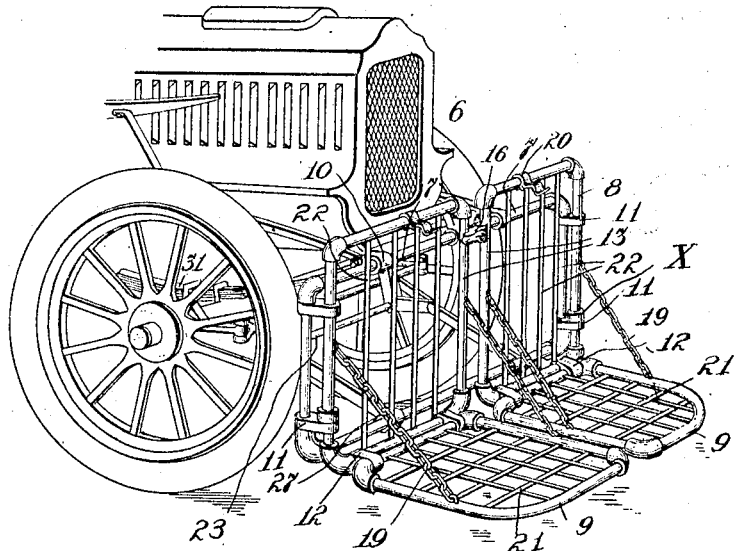
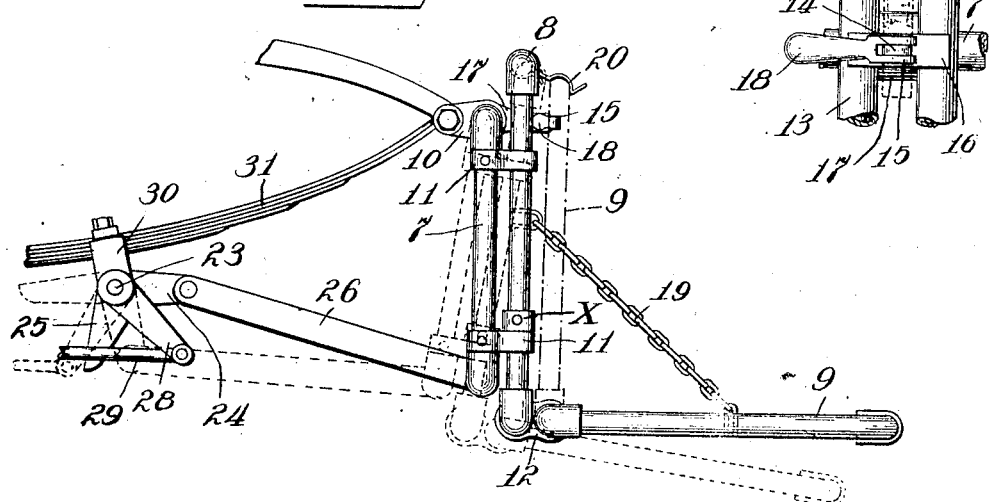

HERBERT A. SUTTLE, OF CHICAGO, ILLINOIS.

VEHICLE-FENDER.

No. 881,973.  Specification of Letters Patent.  Patented March 17, 1908.

Application filed June 27, 1907. Serial No. 381,023.

*To all whom it may concern:*

Be it known that I, HERBERT A. SUTTLE, a citizen of the United States, residing at Chicago, in the county of Cook and State of Illinois, have invented certain new and useful Improvements in Vehicle-Fenders, of which the following is a specification.

My invention is an improvement in vehicle fenders, one of the adaptations of which is a fender for an automobile herein shown, illustrating one specific embodiment of the invention, and the objects of my improvement are, first, to provide a structure capable of movement to allow access to the front of the vehicle; and, second, the provision of means for tilting the fender.

My invention comprises, broadly, one or more folding hinged fenders, tiltable and vertically adjustable.

A further feature of my invention consists in means for locking the fender when in normal position.

In its narrower aspect my improvement consists in the specific construction and arrangement of parts described and claimed herein.

In describing my invention in detail reference is had to the accompanying drawings, forming a part of this specification, wherein like reference characters denote corresponding parts throughout the several views, and in which Figure 1 is a top plan view. Fig. 2 is an end elevation. Fig. 3 is a detail view and Fig. 4 is a perspective view of a fender in position on the front of a vehicle.

The reference character 6 denotes the forward end of an automobile, with my improvement in normal position attached thereto. The supporting frame 7 is suitably attached to the vehicle and carries the upright member 8, and horizontal member 9, of the fender. The frame or form may be of any suitable or desired construction, its chief function being to support the upright member.

The reference numerals 10 represent the hinges of the supporting frame 11, the lateral hinges of the upright member, and 12, the hinges of the horizontal member of the fender.

The inner vertical parts of the member 8 are indicated by 13.

For the purpose of locking the two upright members together when in normal position I provide a lock composed of rod 14, and the nut thereon, eccentric 15, and bearing plate 16, for the eccentric to bear against. The rod 14 is through the coupling 17, of the supporting frame 7. The handle 18 of the lock is pulled outward and swung through the arc of a circle, as shown by the dotted line to unlocking position, and vice versa in locking. The chains 19 serve to hold the member 9 at right angle to the member 8, and permit the former to take the position indicated by the dot and dash outline in Fig. 2, and when in such position is held by spring clip 20.

The interlacing of member 9 is shown as at 21, and the rods or wires 22 passing through member 8.

For the purpose of tilting the fender and lowering the front of member 9, I have provided a rock shaft 23, suitably connected with the supporting frame 7, at 27, by link 26, which is pivotally secured at its opposite end to a bifurcated arm 24, which is attached to or formed integral with the stop 25, and secured to the rock shaft 23. The rock shaft is journaled in bearing 30, carried by vehicle spring 31. The crank arm 28 is fixed to the rock shaft at one end and at the opposite end to the rod 29, which is suitably fastened to the brake lever to be operated simultaneously with the operation of the brake in an emergency.

The hinges 10 preferably are secured at their rear ends to the front ends of the springs 31. The hinges 11, at their rear ends, are fixed to the end of 7 by a collar and set screw, as shown in Figs. 2 and 4. The hinges 12, at their rear ends, are fixed to the lower side of member 8, by a set screw. These hinges are thought to be common in the arts, and, therefore, no extended drawing or description is given of them. Assembling of the parts 7, 8, 9, and of the means for tilting the fender is thought to be common.

It will be apparent the member 8 may be adjusted vertically to suit high or low cars by the collar and set screw $x$ Fig. 2. The upright member 8 is normally substantially vertically disposed and forms the back of the fender proper and is hinged at its outer end to the supporting frame 7 for outward movement of the upright member.

The arm 25 operates as a stop against the bottom of the vehicle spring 31, to prevent further tilting of the supporting frame and the fender. The supporting frame 7 is attached to the vehicle spring, as shown in Figs. 1 and 2.

The frame 7 may be omitted, and the member 8 hinged to the vehicle, and the means for tilting the fender attached to the lower part of member 8.

The fender and supporting means may be constructed of any suitable or desired material, and may be attached in any preferred manner.

It is apparent the member 9 may be raised up and held by the spring catch 20, and each half of the whole fender swung outwardly to uncover the front end of the vehicle. The eccentric lock may be disengaged and one or both parts of the fender swung outwardly to afford access to the end of the vehicle.

In operation, to lower the front of the fender, it is only necessary to operate the brake lever in a direction to draw the rod 29 backward and the fender will take the position indicated by the dotted lines in Fig. 2.

Variation in form, arrangement and construction above described is possible, and I desire, therefore, not to limit my invention to such description of the preferred form in which it has been embodied.

Having thus fully described my invention, what I claim as new, and desire to secure by Letters Patent, is—

1. In a vehicle fender, the combination of a vehicle having a supporting frame attached thereto, an upright member normally substantially vertically disposed and forming the back of the fender proper and hinged at its outer end to the supporting frame for outward movement of the upright member, and a horizontal member carried by the upright member.

2. In a vehicle fender, the combination of a vehicle having a supporting frame attached thereto, an upright member normally substantially vertically disposed and forming the back of the fender proper and hinged at its outer end to the supporting frame for outward movement of the upright member, and a horizontal member hinged to the upright member.

3. In a vehicle fender, the combination of a supporting frame, an upright member hinged to the frame for outward movement, a horizontal member, and means for tilting the frame.

4. In a vehicle fender, the combination of a vehicle having a supporting frame hinged thereto, an upright member hinged to the frame for outward movement, a horizontal member hinged to the upright member, and means for tilting the supporting frame.

In testimony whereof I affix my signature in presence of two witnesses.

HERBERT A. SUTTLE.

Witnesses:
S. ELRA KELLOGG,
FRANK F. ELSNER.